(12) United States Patent
Choi et al.

(10) Patent No.: US 10,587,789 B2
(45) Date of Patent: Mar. 10, 2020

(54) IMAGE SENSOR SIMULTANEOUSLY GENERATING IMAGE AND PROXIMITY SIGNALS

(71) Applicant: Samsung Electronics Co., Ltd., Suwon-Si (KR)

(72) Inventors: Jaehyuk Choi, Seoul (KR); Du-Sik Park, Suwon-si (KR); Joonah Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 761 days.

(21) Appl. No.: 14/723,824

(22) Filed: May 28, 2015

(65) Prior Publication Data

US 2016/0119522 A1    Apr. 28, 2016

(30) Foreign Application Priority Data

Oct. 24, 2014    (KR) .................. 10-2014-0145454

(51) Int. Cl.
*H04N 5/225*    (2006.01)
*H04N 5/378*    (2011.01)

(52) U.S. Cl.
CPC .......... *H04N 5/2256* (2013.01); *H04N 5/378* (2013.01)

(58) Field of Classification Search
CPC ...... H04N 5/2256; H04N 5/347; H04N 5/378; G06F 3/042
See application file for complete search history.

(56) References Cited

U.S. PATENT DOCUMENTS

| | | | |
|---|---|---|---|
| 7,643,010 B2* | 1/2010 | Westerman | G06F 3/0418 345/156 |
| 2003/0062419 A1 | 4/2003 | Ehrhart et al. | |
| 2008/0036996 A1 | 2/2008 | O'Connor et al. | |
| 2010/0200752 A1 | 8/2010 | Lee | |
| 2010/0220077 A1 | 9/2010 | Fukunaga | |
| 2013/0044917 A1 | 2/2013 | Kurokawa | |
| 2013/0141620 A1* | 6/2013 | Nakajima | H04N 5/335 348/302 |
| 2013/0314558 A1* | 11/2013 | Ju | H04N 5/23222 348/208.99 |
| 2014/0027642 A1 | 1/2014 | Warashina et al. | |
| 2014/0131576 A1 | 5/2014 | Park | |
| 2015/0096375 A1* | 4/2015 | Krishnakumar | G01S 17/003 73/509 |
| 2016/0037110 A1* | 2/2016 | Choi | H04N 5/378 348/294 |

FOREIGN PATENT DOCUMENTS

| | | |
|---|---|---|
| JP | 09229620 | 5/1997 |
| JP | 2011107829 A | 6/2011 |
| KR | 102008005711 A | 6/2008 |
| KR | 1020120095681 A | 8/2012 |

* cited by examiner

*Primary Examiner* — Twyler L Haskins
*Assistant Examiner* — Angel L Garces-Rivera
(74) *Attorney, Agent, or Firm* — NSIP Law

(57) ABSTRACT

An image sensor for simultaneously obtaining an image and a proximity is provided. The image sensor includes a proximity signal generating circuit configured to generate a proximity signal of a target based on a pixel signal of a pixel array. The proximity signal generating circuit generates the proximity signal based on an average of pixel signals output from a plurality of pixels included in the pixel array.

10 Claims, 14 Drawing Sheets

IMAGE SENSOR SIMULTANEOUSLY GENERATING IMAGE AND PROXIMITY SIGNALS

CROSS-REFERENCE TO RELATED APPLICATION(S)

This application claims the benefit under 35 USC 119(a) of Korean Patent Application No. 10-2014-0145454, filed on Oct. 24, 2014, in the Korean Intellectual Property Office, the entire disclosure of which is incorporated herein by reference for all purposes.

BACKGROUND

1. Field

The following description relates to an image sensor and an electronic device including the image sensor.

2. Description of Related Art

Image sensors for photography are being embedded in various mobile terminals. The mobile terminals provide various sensors, for example, proximity sensors, illuminance sensors, and gyro sensors, to increase the convenience of the user. The mobile terminals provide various interface such as, for example, touch-less control, through the various sensors. Types and usage environments of the sensors are increasing, whereas battery capacities of the mobile terminals are limited. Due to the limited battery capacities, always-on (AO) sensing is also limited. Further, an increase in a number of sensors to be embedded in a device may impede miniaturization of the device.

An image sensor embedded in a mobile terminal may provide a high-resolution image. The mobile terminal may provide a variety of user experience (UX) through post-processing such as, for example, face detection, face recognition, eye tracking, and gesture detection with respect to the high-resolution image. Since the image sensor embedded in the mobile terminal may require a relatively greater power due to the high-resolution image, AO sensing may be difficult. Further, acquiring an image may be difficult due to a limited sensitivity in a low illuminance environment. To acquire a low-illuminance image, an infrared ray light source may be used. However, since a typical mobile terminal uses an infrared ray cut filter to acquire a high-resolution image, acquiring an image using the infrared ray light source may be impossible. Thus, an image sensor that may acquire an image in a low-illuminance environment and be always operable with a relatively low power may be required.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided an image sensor including a pixel array configured to generate a pixel signal based on light reflected from a target, an analog-to-digital converter (ADC) configured to generate an image signal of the target based on the pixel signal, and a proximity signal generating circuit configured to generate a proximity signal of the target based on the pixel signal.

The proximity signal generating circuit may be configured to generate the proximity signal based on an average of pixels signals output from a plurality of pixels comprising the pixel array.

The proximity signal generating circuit may be configured to generate a proximity signal of a first row and a proximity signal of a second row of the pixel array by accumulating an average of pixel signals output from the first row and an average of pixel signals output from the second row, respectively.

The pixel array may include blocks, and the proximity signal generating circuit is further configured to generate proximity signals for each of the blocks, on pixel signals generated in the respective block.

The image sensor may further include a low-voltage processing circuit configured to generate a low-voltage pixel signal based on a difference between a voltage of the pixel signal and a reset voltage of a floating diffusion (FD) node of the pixel array and a photodiode of the pixel array.

The voltage of the pixel signal may be detected at the FD node when a shutter between the FD node and the photodiode is closed after the FD node and the photodiode are exposed for a period of time with the shutter open.

The image sensor may further include an external light removing circuit configured to generate a pixel signal from which an external light is removed, based on a difference between a first pixel signal generated by the pixel array when a light source configured to radiate a light toward the target is turned on, and a second pixel signal generated by the pixel array when the light source is turned off.

The external light removing circuit may be configured to generate the first pixel signal by resetting and exposing a first row and a second row of the pixel array simultaneously, and to generate the second pixel signal by resetting and exposing the first row and the second row sequentially.

The external light removing circuit may be configured to transmit the first pixel signal to a first terminal of a comparator, to transmit the second pixel signal to a second terminal of the comparator, to shift levels of the first pixel signal and the second pixel signal at a low power, and to generate the pixel signal from which the external light is removed based on an output of the comparator.

The external light removing circuit may include a reconfigurable comparator configured to output a difference between the first pixel signal and the second pixel signal, or a source follower configured to output the first pixel signal and the second pixel signal based on a switching operation.

In another general aspect, there is provided an electronic device including a light source configured to radiate a light toward a target, a first image sensor configured to generate a first image signal of the target and a proximity signal of the target based on a light reflected from the target, and a processor configured to determine a position of the target based on at least one of the first image signal and the proximity signal.

The pixels signals may be generated by blocks of a pixel array, and the first image sensor may be further configured to generate proximity signals for each block, and the processor may be further configured to determine at least one of a depth of the target, vertical position of the target, and horizontal position of the target object based on the proximity signals.

The processor may be configured to determine vertical and horizontal positions of the target based on the first image signal, and to determine a depth of the target based on the proximity signal.

The electronic device may include a second image sensor with a different sensing angle from a sensing angle of the first image sensor, the second image sensor configured to generate a second image signal of the target, wherein the processor is configured to generate stereo information on the target based on the first image signal and the second image signal.

The target may include at least a portion of a body of a user, and the processor is further configured to detect at least one of a face of the user and an eye of the user based on the first image sensor.

In another general aspect, there is also provided a method of sensing an image, the method including receiving a light reflected by a target, generating a pixel signal based on the reflected light, generating an image signal of the target based on the pixel signal, and generating a proximity signal of the target based on the pixel signal.

The generating of the pixel signal may include generating a low-voltage pixel signal based on a difference between a voltage of the pixel signal and a reset voltage of a floating diffusion (FD) node of a pixel array and a photodiode of the pixel array.

The generating of the pixel signal may include generating a pixel signal from which an external light is removed based on a difference between a first pixel signal generated by a pixel array when a light source configured to radiate a light toward the target is turned on, and a second pixel signal generated by the pixel array when the light source is turned off.

The generating of the proximity signal may include generating the proximity signal based on an average of pixel signals output from pixels comprising a pixel array.

The generating of the proximity signal may include generating a proximity signal of a first row and a second row of a pixel array by accumulating an average of pixel signals output from the first row and an average of pixel signals output from the second row, respectively.

The generating of the proximity signal may include determining a position of the target based on a comparison of an intensity of proximity signal generated by each block of a pixel array.

The generating of the proximity signal may include determining a depth of the target to be inversely proportional to an intensity of the proximity signal.

Other features and aspects will be apparent from the following detailed description, the drawings, and the claims.

Figure 1:
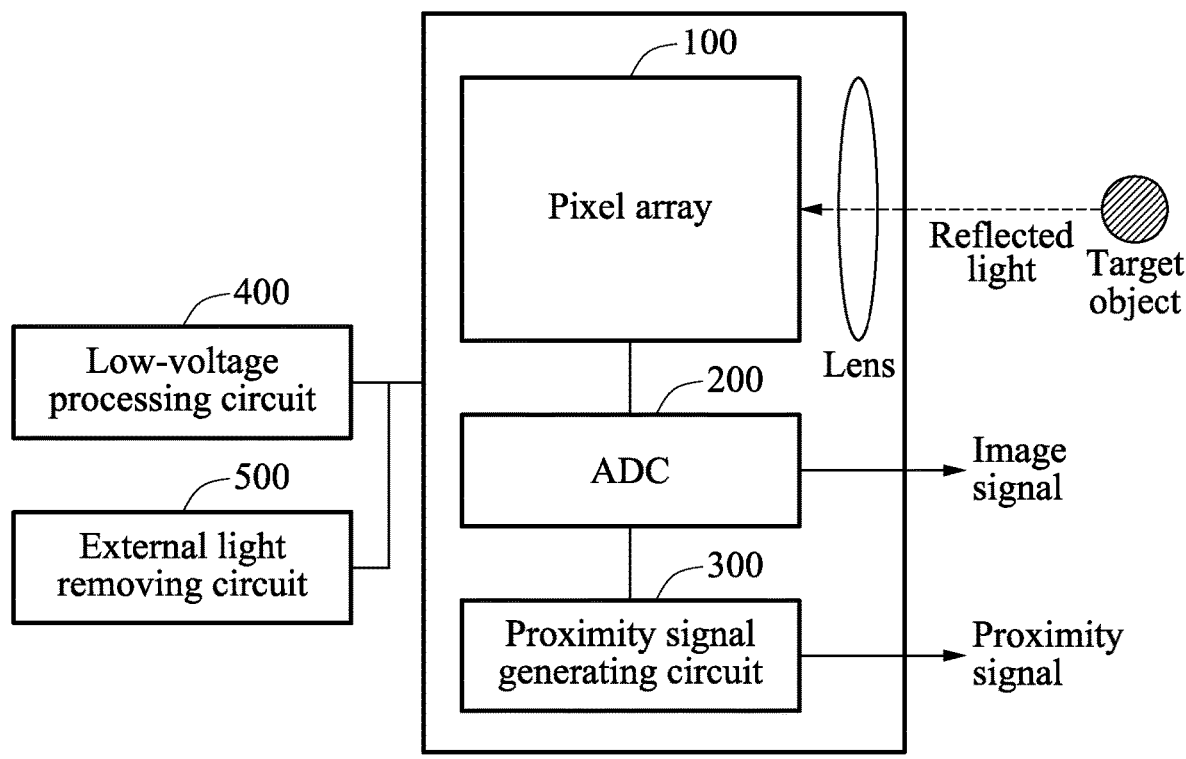
FIG. 1 is a diagram illustrating an example of an image sensor configured to simultaneously generate an image signal and a proximity signal.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Various alterations and modifications may be made to the examples. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

The terminology used herein is for the purpose of describing particular examples only and is not to be limiting of the examples. As used herein, the singular forms "a," "an," and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

As a non-exhaustive illustration only, an mobile terminal described herein may refer to mobile devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a head mount display (HMD) apparatus, a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed herein.

FIG. 1 is a diagram illustrating an example of an image sensor configured to generate an image signal and a proximity signal simultaneously.

Referring to FIG. 1, an image sensor includes a pixel array 100, an analog-to-digital converter (ADC) 200, and a proximity signal generating circuit 300. The image sensor further includes a low-voltage processing circuit 400, and an external light removing circuit 500. The low-voltage processing circuit 400 and the external light removing circuit 500 may be implemented as a circuit device of the pixel array 100, the ADC 200, and the proximity signal generating circuit 300.

The pixel array 100 may generate a pixel signal based on a light reflected from a target object, such as, for example, a finger of a user or a stylus pen used for a touch-less input. Further, the target object may be a portion of a body of the user that is used to detect at least one of a face of the user and an eye of the user. The reflected light may include an infrared ray component radiated toward the target object. The reflected light may include an external light including a visible ray component. The reflected light may be received through a condenser such as, for example, a lens.

The pixel array 100 may include a plurality of pixels. The pixels may be classified into a plurality of rows and a plurality of columns. The image sensor may include a row scanner configured to select at least one of the plurality of rows, and a column scanner configured to select at least one of the plurality of columns. Each of the plurality of pixels may output pixel signals. A process of generating a pixel signal will be described with reference to FIGS. 2 and 3.

Figure 2A:
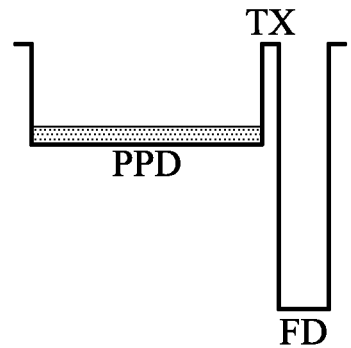
FIG. 2A through 2C illustrate an example of a process of generating a pixel signal.
Figure 2B:
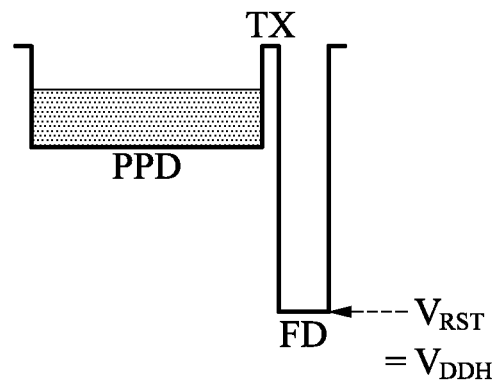
Figure 2C:
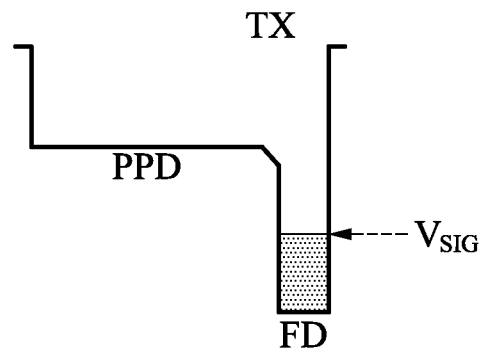

FIGS. 2A through 2C illustrates an example of a process of generating a pixel signal. In FIGS. 2A through 2C, TX denotes an electronic shutter, PPD denotes a pinned-photodiode, and FD denotes a floating diffusion (FD) node. In FIG. 2A, the PPD may be exposed to a light for a predetermined time period. In FIG. 2B, a voltage of the FD may be reset to a high voltage $V_{DDH}$. $V_{RST}$ denoting a reset voltage may correspond to $V_{DDH}$. In FIG. 2C, TX may be open, and electric charges accumulated in the PPD may be transferred to the FD. A voltage $V_{SIG}$ of the electric charges transferred to the FD may be output as a pixel signal. The pixel signal may be output through a source follower.

The operations of FIGS. 2B through 2C may be performed simultaneously with respect to all pixels of a pixel array. The operation of FIG. 2B may be a global reset operation, and the operation of FIG. 2C may be a global transfer operation. To perform the operations of FIG. 2B-2C with respect to all pixels, the voltage of the FD may need to be reset to a high voltage. The high voltage may also be required to transfer the electric charges accumulated in the FD to the source follower. The high voltage may be a voltage, such as, for example, 3.3 volts (V). A direct current for biasing may flow through the source follower. Thus, as a voltage to be used increases, a power consumption may also increase. A pixel signal generated by exposing the PPD in a state in which the TX is closed is defined as a high-voltage pixel signal.

Figure 3A:
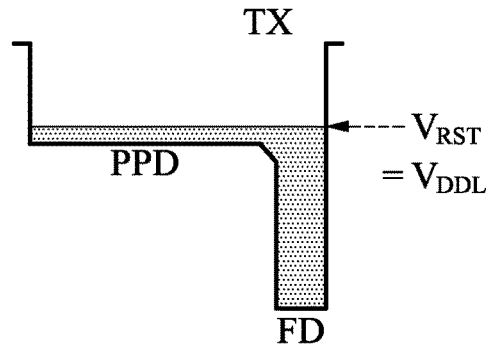
FIG. 3A through 3C illustrate an example of a process of generating a pixel signal.
Figure 3B:
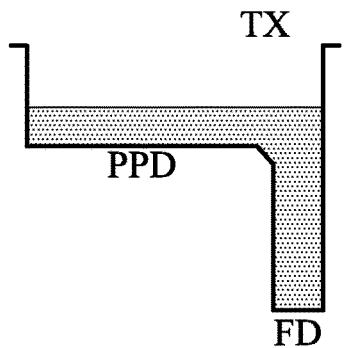
Figure 3C:
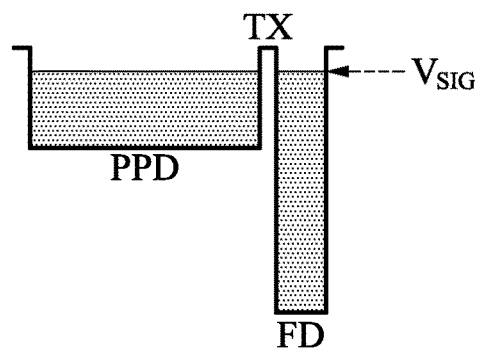

FIGS. 3A through 3C illustrate an example of a process of generating a pixel signal.

In FIGS. 3A through 3C, TX denotes an electronic shutter, PPD denotes a pinned-photodiode, and FD denotes an FD node. In the operation of FIG. 3A, a voltage of the PPD and the FD may be reset to a low voltage $V_{DDL}$. $V_{RST}$ denoting a reset voltage may correspond to $V_{DDL}$. In the operation of FIG. 3B, the PPD and the FD may be exposed to a light for a predetermined time period in a state in which the TX is open. In the operation of FIG. 3C, the TX may be closed, and a voltage $V_{SIG}$ of electric charges accumulated in the FD may be output as a pixel signal. The pixel signal may be output through a source follower.

In the operations of FIGS. 3A and 3B, a high voltage may be applied to the TX for an open state. Although the high voltage is applied to the TX, a current may not flow through the TX. Thus, a power consumption of the TX may be zero. Further, in the operations of FIGS. 3A and 3B, the PPD and the FD may have identical electron potentials. Similar to the method described with reference to FIGS. 2A through 2C, a high reset voltage for electric charge transfer may not be required. Resetting through a low voltage may be possible. The low voltage may be, such as, for example, a voltage lower than or equal to 1 V. In addition, a voltage of the source follower may be lowered. A pixel signal generated by exposing the PPD in a state in which the TX is open is defined as a low-voltage pixel signal.

Referring to FIG. 1 again, the ADC 200 may generate an image signal of the target object based on the pixel signal. The ADC 200 may generate the image signal based on the low-voltage pixel signal. The ADC 200 may generate the image signal based on a pixel signal of a pixel selected by the row scanner and the column scanner. The image signal may be a signal of an infrared ray component.

The proximity signal generating circuit 300 may generate a proximity signal of the target object based on the pixel signal. The proximity signal generating circuit 300 will be described with reference to FIG. 4.

Figure 4:
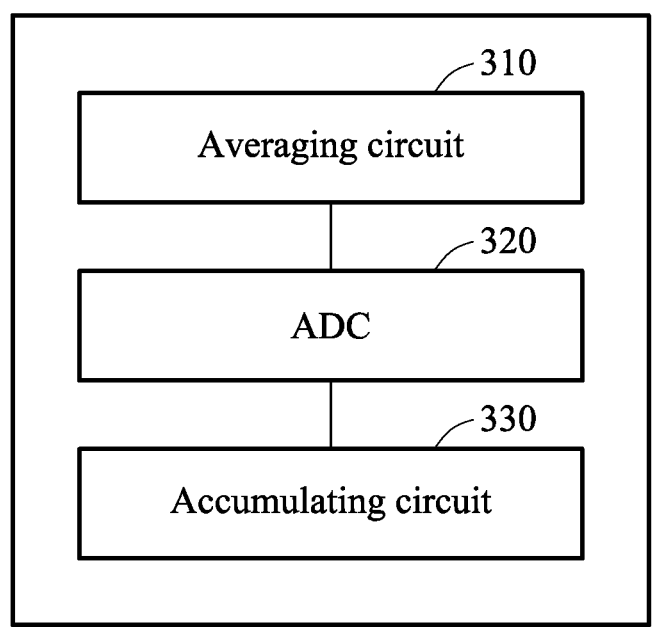
FIG. 4 is a diagram illustrating an example of a proximity signal generating circuit.

FIG. 4 is a diagram illustrating an example of a proximity signal generating circuit. Referring to FIG. 4, the proximity signal generating circuit 300 includes an averaging circuit 310, an ADC 320, and an accumulating circuit 330.

The averaging circuit 310 may generate an average value of pixel signals output from a plurality of pixels included in the pixel array 100. The averaging circuit 310 may include a plurality of capacitors and a plurality of switches. The averaging circuit 310 may be implemented as various devices and configurations for averaging processing.

The ADC 320 may convert the average value generated by the averaging circuit 310 into a digital signal. The ADC 320 may have a structure identical to that of the ADC 200.

The accumulating circuit 330 may generate a proximity signal by accumulating digital signals generated by the ADC 320. The accumulating circuit 330 may be implemented as various devices and configurations for accumulation processing.

For example, when a proximity signal with respect to a first row and a second row of the pixel array 100 is to be generated, the averaging circuit 310 may generate an average value of pixel signals output from the first row of the pixel array 100, and an average value of pixel signals output from the second row of the pixel array 100. The ADC 320 may convert the average values into digital signals. The accumulating circuit 330 may generate the proximity signal with respect to the first row and the second row of the pixel array 100 by accumulating the digital signals.

Referring to FIG. 1, the low-voltage processing circuit 400 may generate a low-voltage pixel signal based on a difference between a voltage $V_{SIG}$ of the pixel signal and a reset voltage $V_{RST}$ of an FD node of the pixel array 100 and a PPD of the pixel array 100. The voltage $V_{SIG}$ of the pixel signal may be globally detected at the FD node in a state in which a TX between the FD node and the PPD is closed after the FD node and the PPD are exposed in a state in which the TX is open. The low-voltage processing circuit 400 may include a device configured to read the voltage $V_{SIG}$ of the pixel signal from the FD node, and a device configured to obtain the difference between the voltage $V_{SIG}$ of the pixel signal and the reset voltage $V_{RST}$.

Referring to FIG. 1, the external light removing circuit 500 may generate a pixel signal from which an external light is removed. The image sensor may generate an image signal and a proximity signal using an infrared ray in a low-illuminance environment. The infrared ray may be radiated from a separate light source. When the image signal and the proximity signal are generated using an infrared ray, an external light such as a visible ray may be received along with the infrared ray. In this example, the external light removing circuit 500 may remove the external light to increase sensitivity. To decrease a power consumption, the external light may be received in a turn-off cycle of the light source when the light source operates in a burst mode. The burst mode may refer to an operating mode in which a turn-on cycle in which a light is radiated and a turn-off cycle in which a light is not radiated are iterated periodically. In this example, the external light removing circuit 500 may remove the external light received in the turn-off cycle. A process of removing an external light using the external light removing circuit 500 will be described with reference to FIG. 5.

Figure 5:
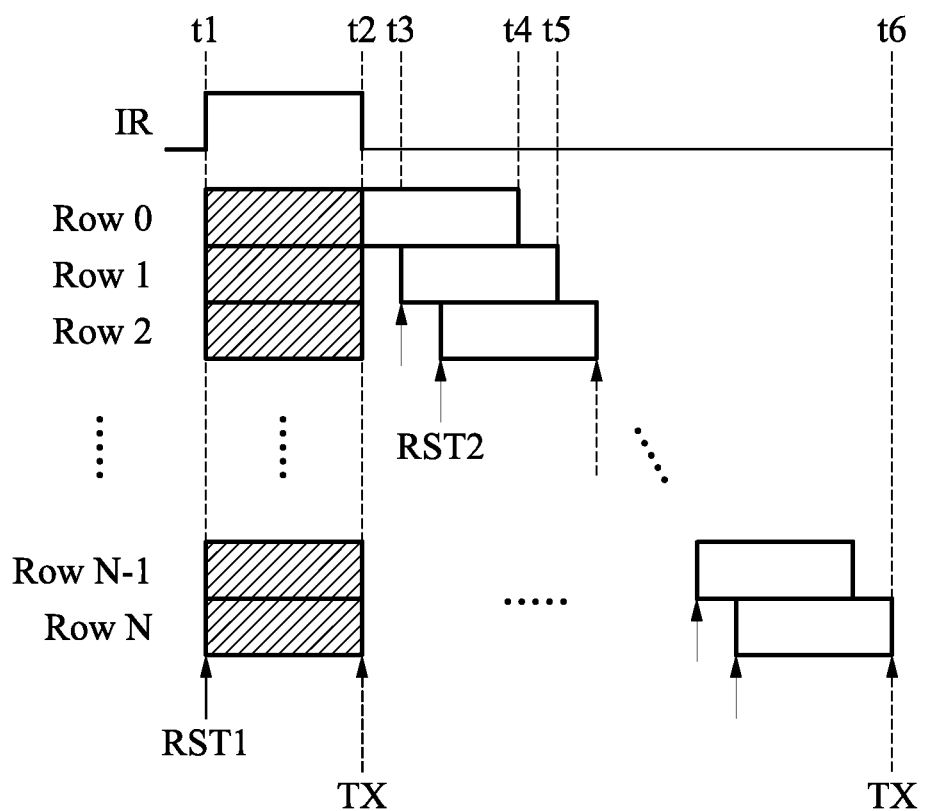
FIG. 5 is a diagram illustrating an example of a process of removing an external light.

FIG. 5 is a diagram illustrating an example of a process of removing an external light. Referring to FIG. 5, a control signal IR of a light source, control signals RST1, RST2, and TX of the pixel array 100, and pixel signals of each row with respect to times t1 through t6 are illustrated. The light source may radiate an infrared ray from t1 to t2 based on the control signal IR. In t1, FD nodes and PPDs of all pixels of the pixel array 100 may be reset simultaneously. In t2, pixel signals of electric charges accumulated during an exposure time (t2−t1) may be transferred simultaneously from all the pixels to the FD nodes in a state in which the light source is turned on. The electric charges transferred to the FD nodes may be stored in the FD nodes until pixel signals by a visible ray are obtained. In t2, a PPD of Row 0 may be reset through RST2. In t3, a PPD of Row 1 may be reset through RST2. Similarly, PPDs of all the rows may be reset in a rolling shutter manner. In t4, the external light removing circuit 500 may read out pixel signals by the infrared ray stored in an FD node of Row 0, transfer electric charges by the visible ray accumulated in the PPD to the FD node, and read out pixel signals by the visible ray from the FD node. In t5, the external light removing circuit 500 may read out pixels signals by the infrared ray stored in an FD node of Row 1, transfer electric charges by the visible ray accumulated in the PPD to the FD node, and read out pixel signals by the visible ray from the FD node. Similarly, the external light removing circuit 500 may read out pixel signals by the visible ray and pixel signals by the infrared ray of all the rows in the rolling shutter manner.

Since the external light removing circuit 500 may consecutively read out the pixels signals by the infrared ray and the pixel signals by the visible ray from the FD nodes, a memory configured to store the pixel signals by the infrared ray may be not be needed. Thus, a cost for producing a memory and a size of a chip may be reduced. The external light removing circuit 500 may generate the pixel signal from which the external light is removed based on a difference between a pixel signal by an infrared ray and a pixel signal by a visible ray. The external light removing circuit 500 may include a device configured to obtain the difference between the pixel signal by the infrared ray and the pixel signal by the visible ray.

Figure 6:
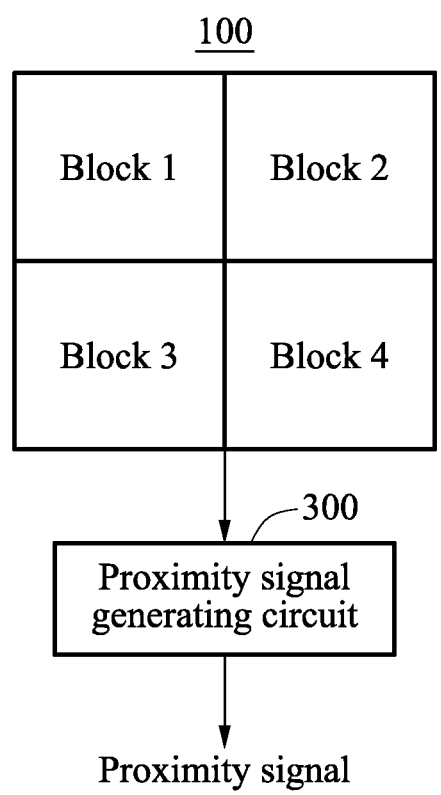
FIG. 6 is a diagram illustrating an example of a process of generating proximity signals with respect to a plurality of blocks.

FIG. 6 is a diagram illustrating an example of a process of generating proximity signals with respect to a plurality of blocks. Referring to FIG. 6, the pixel array 100 and the proximity signal generating circuit 300 are illustrated. The pixel array 100 may include a plurality of blocks. For example, the pixel array 100 may include 2×2, i.e., four blocks, or 3×3, i.e., nine blocks. Each block may include a plurality of rows and a plurality of columns.

The proximity signal generating circuit 300 may generate a plurality of proximity signals for each of the plurality of blocks based on pixel signals generated in the respective block. For example, the proximity signal generating circuit 300 may generate a proximity signal with respect to a block 1 based on pixel signals generated in the block 1, and generate a proximity signal with respect to a block 2 based on pixel signals generated in the block 2. The proximity signal generating circuit 300 may generate the proximity signal with respect to the block 1 based on an average of pixel signals output from a plurality of pixels included in the block 1. The proximity signal generating circuit 300 may generate the proximity signal with respect to the block 2 based on an average of pixel signals output from a plurality of pixels included in the block 2. The proximity signals with respect to the plurality of blocks may be used to determine a position of a target object.

Figure 7:
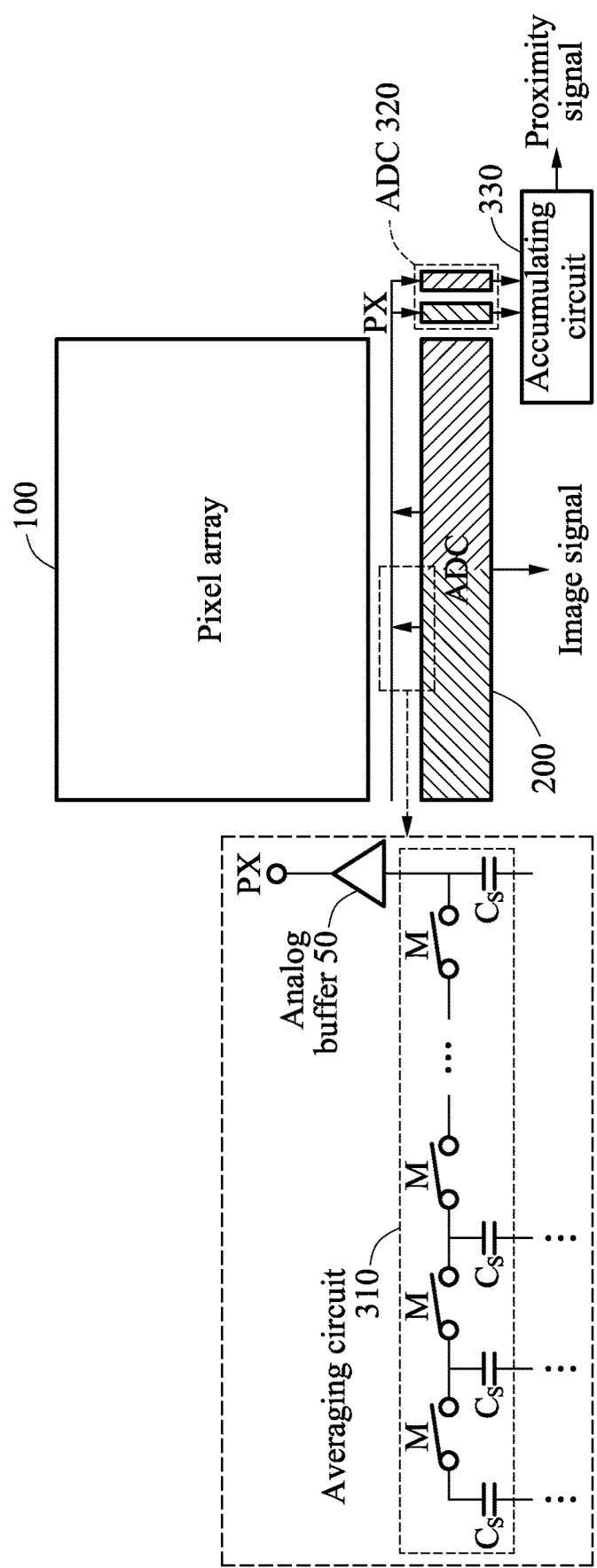
FIG. 7 is a diagram illustrating an example of an image sensor configured to generate an image signal and a proximity signal simultaneously.

FIG. 7 is a diagram illustrating an example of an image sensor configured to generate an image signal and a proximity signal simultaneously. The pixel array 100, the ADC 200 configured to generate an image signal, the averaging circuit 310, the ADC 320, and the accumulating circuit 330 of the proximity signal generating circuit 300 are illustrated in FIG. 7.

The ADC 200 may include a plurality of blocks. Each block may include a plurality of rows. A number of blocks and a number of rows constituting a block may be varied without departing from the spirit and scope of the illustrative examples described. When performing an analog-to-digital conversion, a pixel signal may be sampled in a capacitor $C_s$. A capacitor $C_s$ of each row may be connected to a corresponding switch M. When switches M are closed after the analog-to-digital conversion is performed, voltages of capacitors $C_s$ of all rows in the block may be averaged. An averaged voltage $V_{PX}$ may be read out to a PX line through an analog buffer 50, and sampled to the ADC 320.

A number of ADCs 320 may be equal to a number of blocks of the ADC 200. A structure of the ADC 320 may be identical to a structure of the ADC 200. The sampled averaged signal may be stored in the ADC 320, and converted into a digital signal when an analog-to-digital conversion is performed on a subsequent row by the ADC 200. Since the ADC 200 and the ADC 320 have identical structures, an additional control signal and an additional timing budget may not be required. The analog-to-digital converted proximity signal may be input into the accumulating circuit 330, and added to proximity signals accumulated in a previous row.

The same process of generating a proximity signal may be applied to a pixel signal PS1 by an infrared ray and a pixel signal PS2 by a visible ray that are described with reference to FIG. 5. For example, an averaged signal sampled with respect to PS1 may be stored in the ADC 320. An averaged signal sampled with respect to PS2 may be input into the ADC 320. A proximity signal from which an external light is removed may be obtained from a difference between the averaged signal sampled with respect to PS1 and the averaged signal sampled with respect to PS2 when performing an analog-to-digital conversion through the ADC 320.

Figure 8:
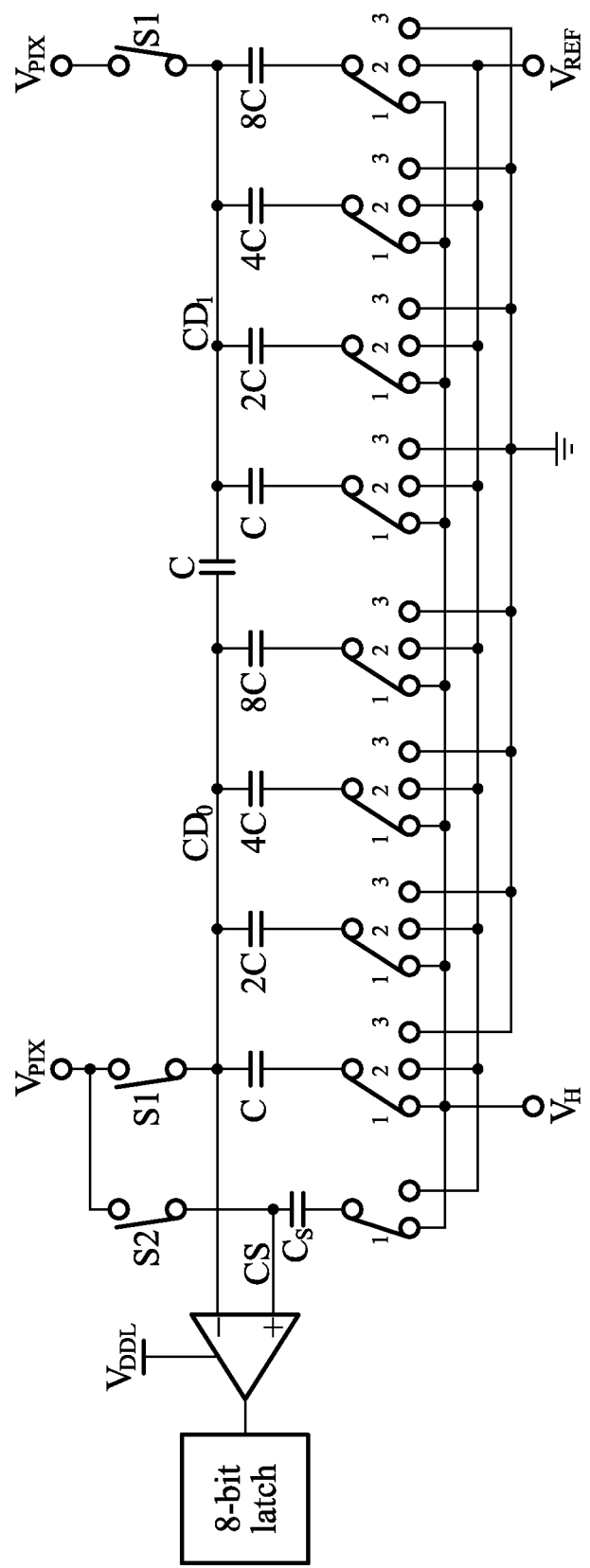
FIG. 8 is a circuit diagram illustrating an example of low-power shifting.
Figure 9:
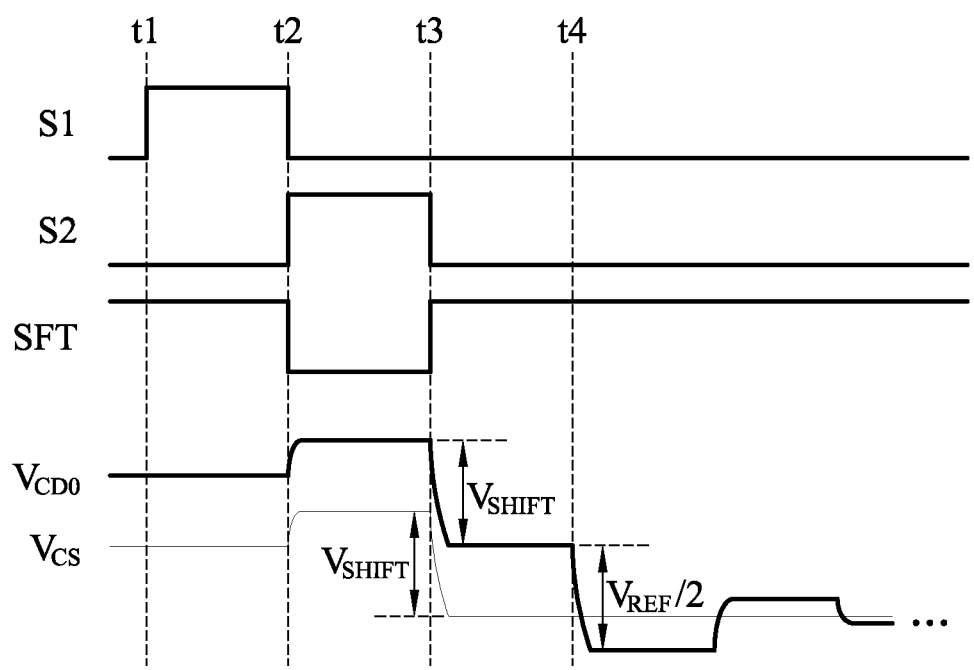
FIG. 9 is a timing diagram illustrating an example of low-power shifting.

FIG. 8 is a circuit diagram illustrating an example of low-power shifting. FIG. 9 is a timing diagram illustrating an example of low-power shifting. A low-power shifting process will be described with reference to FIGS. 8 and 9.

A power consumption may be reduced through a successive approximation ADC (SAR ADC). The SAR ADC may complete a conversion in a cycle N using a binary search algorithm, and thus, may not require a high-frequency clock. The SAR ADC may require a capacitive digital-to-analog converter (DAC) including a capacitor array to generate various reference voltages for the binary search algorithm.

When a unit capacitance for an N-bit conversion is expressed by C, a capacitor of 2NC may be required. To reduce a capacitance in the SAR ADC, series capacitors as shown in FIG. 8 may be used.

By connecting a most significant bit (MSB) capacitor array to a least significant bit (LSB) capacitor array through the series capacitors, an overall area of the capacitors may be reduced. Although FIG. 8 illustrates a structure using series capacitors of 1C, the series capacitors may be implemented variously without departing from the spirit and scope of the illustrative examples described. In FIG. 8, a total capacitance of an 8-bit DAC may be 31C. When series capacitors of 1C are used, a linearity may decrease in comparison to when capacitors of 2NC are used. However, in this example, a power consumption and an area may be reduced.

When removing an external light, a pixel signal may be of a high voltage. To drive an ADC circuit at a low voltage, level shifting may be required. A switch connected to the capacitive DAC may be connected to a high voltage $V_H$ of a node 1 in an initial state. In t1, S1 may be applied and a pixel signal PS1 by an infrared ray stored in an FD node may be sampled to $CD_0$ and $CD_1$ through $V_{PIX}$. In t2, S2 may be applied and a pixel signal PS2 by a visible ray stored in the FD node may be sampled to CS. In t3, the switch may be moved to a node 2. In response to the movement of the switch, a voltage of $CD_0$ and $CD_1$ may be $V_{PIX}-(V_H-V_{REF})$. A pixel voltage of a high voltage may be level-shifted by $V_{SHIFT}=V_H-V_{REF}$. $V_{REF}$ denotes a reference voltage of the SAR ADC. In t4, when level shifting is completed, and an input voltage of both ends of a comparator enters a low-voltage region, the SAR ADC may initiate an analog-to-digital conversion. The ADC may output a digital signal with respect to a difference between PS1 and PS2.

In a case of a low-voltage pixel signal, level shifting may not be required. Thus, a switch may be connected to the node 1 in an initial state. $V_{SIG}$ may be sampled to $CD_0$ and $CD_1$, and $V_{RST}$ may be sampled to CS. When an analog-to-digital conversion is completed, a digital value of $V_{RST}-V_{SIG}$ may be output.

Figure 10:
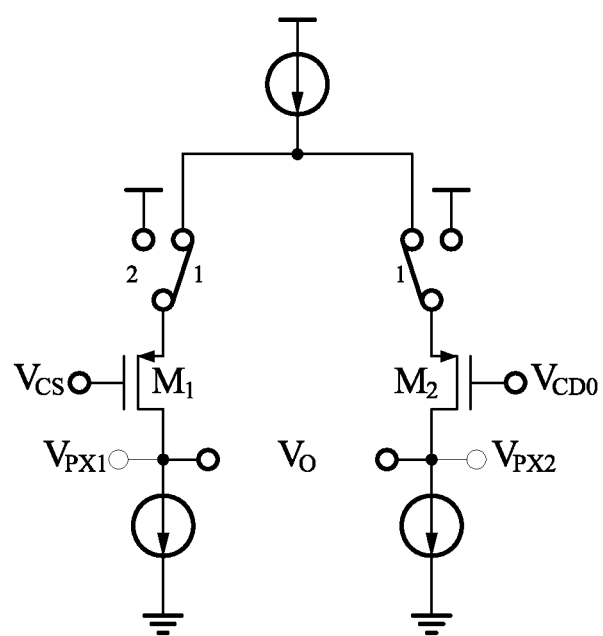
FIG. 10 is a circuit diagram illustrating an example of a reconfigurable comparator.

FIG. 10 is a circuit diagram illustrating an example of a reconfigurable comparator. As described with reference to FIG. 7, the analog buffer 50 may be used to read out an averaged voltage. In this example, a reconfigurable comparator, as shown in FIG. 10, may be used to read out an averaged voltage, without using an additional circuit.

The reconfigurable comparator may operate as a differential comparator configured to output a difference between a pixel signal PS1 by an infrared ray and a pixel signal PS2 by a visible ray, or a source follower configured to output PS1 and PS2, based on a switching operation. In FIG. 10, when a switch is connected to a node 1, the reconfigurable comparator may operate as the differential comparator. When the switch is connected to a node 2, the reconfigurable comparator may operate as the source follower. The external light removing circuit 500 may include the reconfigurable comparator to reduce a power consumption and an area.

Figure 11:
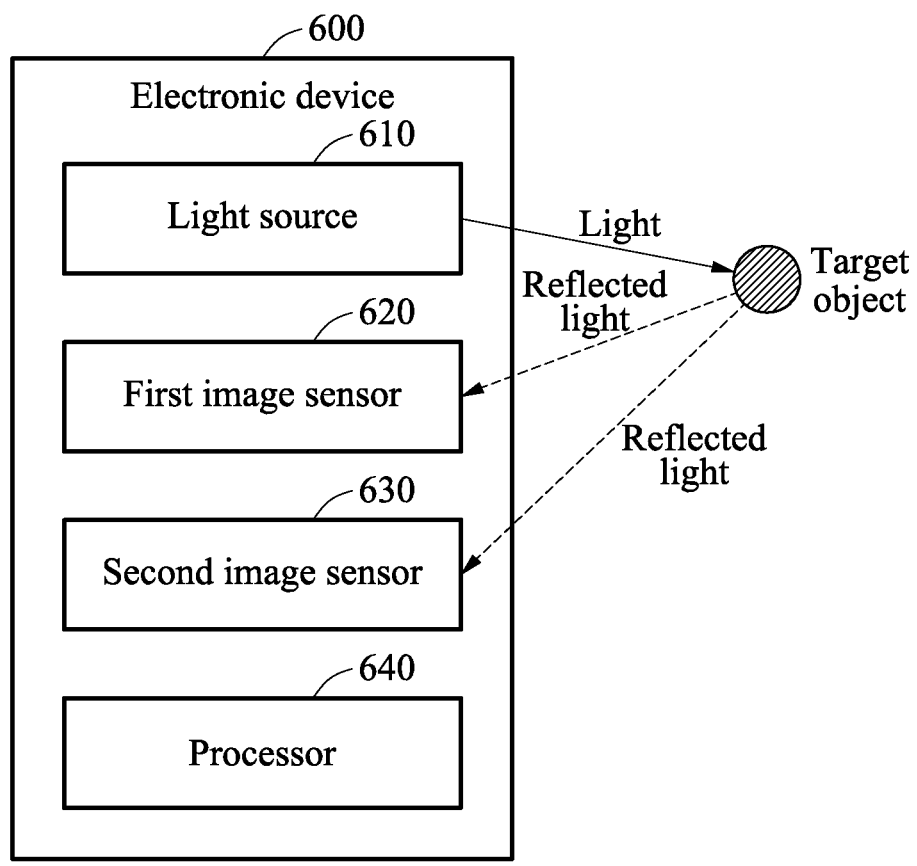
FIG. 11 is a diagram illustrating an example of an electronic device configured to obtain an image signal and a proximity signal simultaneously through an image sensor.

FIG. 11 is a diagram illustrating an example of an electronic device to obtain an image signal and a proximity signal simultaneously through an image sensor.

Referring to FIG. 11, an electronic device 600 includes a light source 610, a first image sensor 620, and a processor 640. The electronic device 600 further includes a second image sensor 630. The electronic device 600 may further include an illuminance sensor to obtain information on a peripheral illuminance.

The light source 610 may radiate a light toward a target object. The light source 610 may include a light emitting diode (LED)-based source, a laser, an incandescent source, and a fluorescent source. The incandescent source may be a source, such as, for example, a filament lamp and a halogen lamp. The LED-based source may be a source, such as, for example, an infrared LED, an ultraviolet LED, a red LED, a blue LED, a green LED, a yellow LED, an amber LED, an orange LED, and a white LED. In a non-exhaustive example, the light source 610 may be the infrared LED.

The first image sensor 620 may generate a first image signal of the target object and a proximity signal of the target object based on a light reflected from the target object. The first image sensor 620 may generate a plurality of proximity signals with respect to a plurality of blocks based on pixel signals output from the plurality of blocks of a pixel array. The first image sensor 620 may include the pixel array 110, the ADC 200, the proximity signal generating circuit 300, the low-voltage processing circuit 400, and the external light removing circuit 500. The descriptions provided with reference to FIGS. 1 through 10 may be applicable to the first image sensor 620, and is incorporated herein by refer. Thus, the above description may not be repeated here.

The second image sensor 630 may generate a second image signal of the target object. The second image sensor 630 may be a camera provided in a mobile terminal. The first image sensor 620 and the second image sensor 630 may photograph the target object at different angles. The second image sensor 630 may generate the second image signal of the target object, with respect to a sensing angle differing from a sensing angle of the first image sensor 620.

The processor 640 may determine a position of the target object based on at least one of the first image signal, the second image signal, and the proximity signal. The processor 640 may determine at least one of a depth of the target object and vertical and horizontal positions of the target object based on the plurality of proximity signals generated by the first image sensor 620. The determination of the position based on the plurality of proximity signals is described with reference to FIGS. 12A through 12D.

Figure 12A:
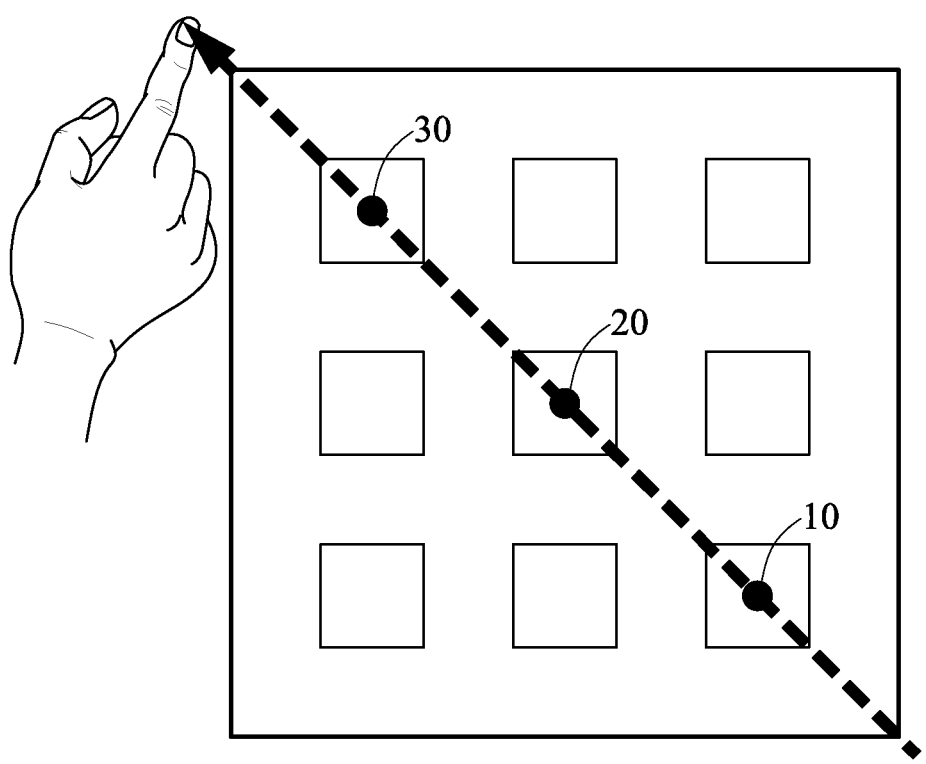
FIGS. 12A through 12D illustrate an example of a process of recognizing a gesture.
Figure 12B:
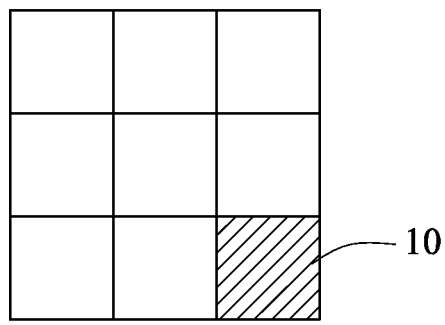
Figure 12C:
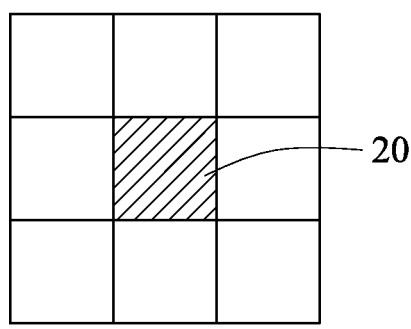
Figure 12D:
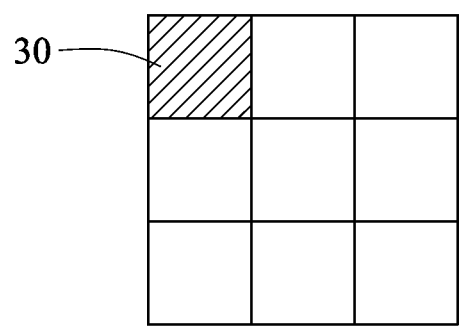

FIGS. 12A through 12D illustrate an example of a process of recognizing a gesture. FIG. 12A illustrates a pixel array including a plurality of blocks, a finger of a user as a target object, and a gesture performed by the finger of the user. FIGS. 12B, 12C, and 12D illustrate positions at which a proximity signal is detected.

The user may move the finger from a lower right end of the pixel array to an upper left end of the pixel array, as shown in FIG. 12A. In this example, the pixel array may generate proximity signals with respect to a plurality of blocks. Intensities of the proximity signals generated by the different blocks may differ from each other based on an intensity of a light reflected by the finger.

The processor 640 may determine that the finger is at a position corresponding to a block in which an intensity of a proximity signal is greatest, among the plurality of blocks. For example, FIG. 12B illustrates a block generating a proximity signal having a greatest intensity in a time 10, FIG. 12C illustrates a block generating a proximity signal having a greatest intensity in a time 20, and FIG. 12D illustrates a block generating a proximity signal having a greatest intensity in a time 30. In this example, the processor 640 may recognize a gesture moving from the lower right end to the upper left end.

Further, the processor 640 may determine a depth of the target object based on an intensity of a proximity signal. The processor 640 may determine that the target object is at a relatively shallow depth when the intensity of the proximity signal is relatively great, and determine that the target object is at a relatively deep depth when the intensity of the proximity signal is relatively small. The processor 640 may determine at least one of the depth of the target object and the vertical and horizontal positions of the target object based on the plurality of proximity signals.

Referring to FIG. 11, the processor 640 may use an image signal to determine the vertical and horizontal positions of the target object. The processor 640 may determine the vertical and horizontal positions of the target object based on the image signal, and determine the depth of the target object based on the proximity signal.

The processor 640 may generate stereo information on the target object based on the first image signal generated by the first image sensor 620, and the second image signal generated by the second image sensor 630. The target object may include at least a portion of a body of the user. The processor 640 may detect at least one of a face of the user and an eye of the user based on the first image signal.

Figure 13:
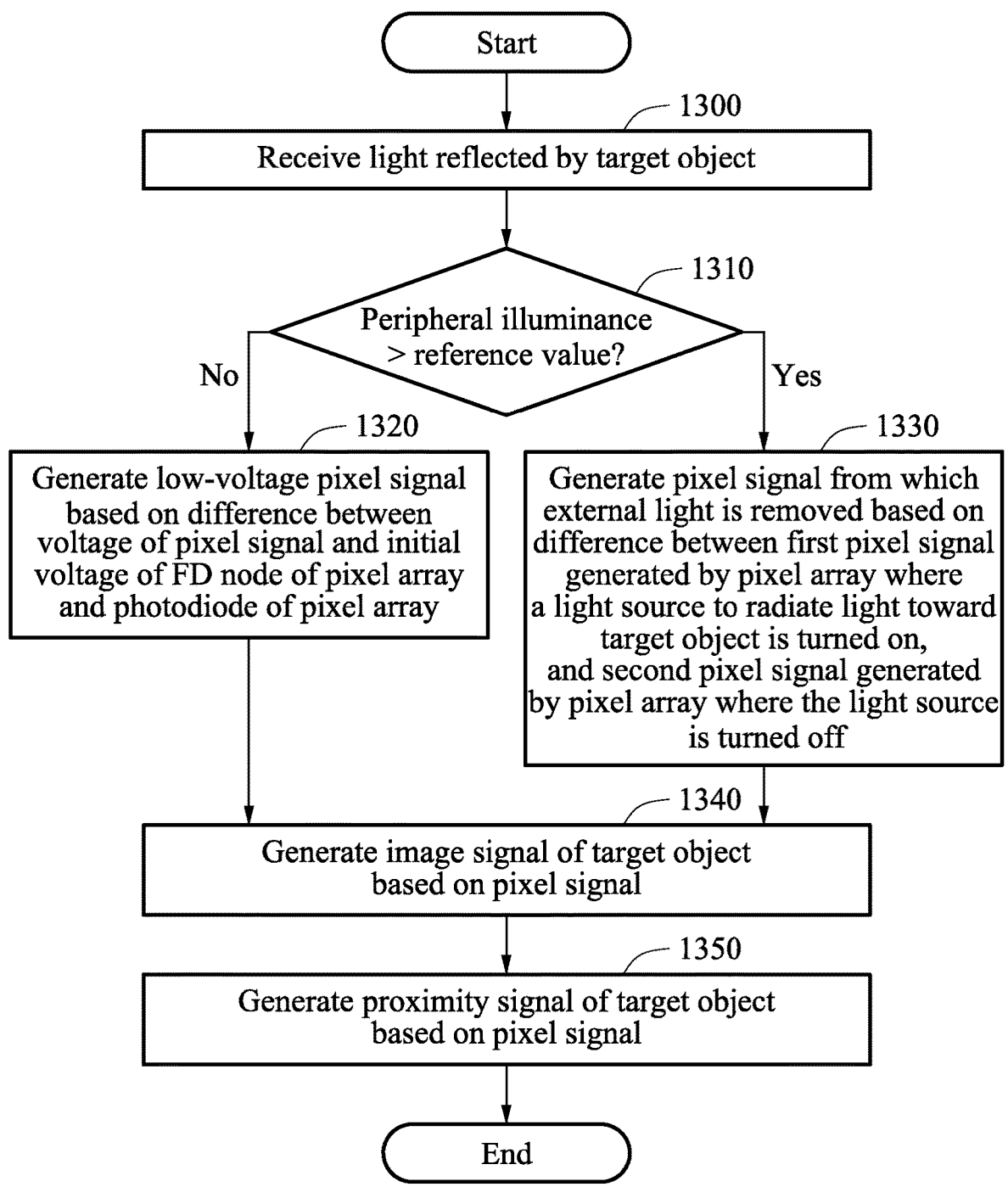
FIG. 13 is a diagram illustrating an example of a method of sensing an image to generate an image signal and a proximity signal simultaneously.

FIG. 13 is a diagram illustrating an example of a method of sensing an image to generate an image signal and a proximity signal simultaneously. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. The above descriptions of FIGS. 1-12, is also applicable to FIG. 13, and is incorporated herein by reference. Thus, the above description may not be repeated here.

Referring to FIG. 13, in operation 1300, an image sensor receives a light reflected by a target object.

In operation 1310, the image sensor compares a peripheral illuminance to a reference value.

In operation 1320, the image sensor generates a low-voltage pixel signal based on a difference between a voltage of a pixel signal and an initial voltage of an FD node of a pixel array and a photodiode of the pixel array.

In operation 1330, the image sensor generates a pixel signal from which an external light is removed, based on a difference between a first pixel signal generated by the pixel array where a light source to radiates a light toward the target object is turned on, and a second pixel signal generated by the pixel array where the light source is turned off.

In operation 1340, the image sensor generates an image signal of the target object based on the pixel signal.

In operation 1350, the image sensor generates a proximity signal of the target object based on the pixel signal. The image sensor may generate the proximity signal based on an average of pixel signals output from a plurality of pixels included in the pixel array. Further, the image sensor may generate a proximity signal of a first row and a second row of the pixel array by accumulating an average of pixel signals output from the first row and an average of pixel signals output from the second row.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors or multi-core processors.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices. A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

The processes, functions, and methods described above can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, Wi-Fi, etc.). In addition, functional programs, codes, and code segments for accomplishing the example disclosed herein can be construed by programmers skilled in the art based on the flow diagrams and block diagrams of the figures and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An image sensor, comprising:
   a pixel array configured to generate a pixel signal based on light reflected from a target;
   a voltage processing circuit configured to generate a reduced voltage pixel signal based on a difference between a voltage of the pixel signal and a reset voltage of a floating diffusion (FD) node of the pixel array and a photodiode of the pixel array;
   an analog-to-digital converter (ADC) configured to generate an image signal of the target based on the pixel signal; and
   a proximity signal generating circuit configured to generate a proximity signal of the target based on an average of pixel signals output from a row of pixels included in the pixel array.

2. The image sensor of claim 1, wherein the proximity signal generating circuit is further configured to generate a proximity signal of the row of pixels included in the pixel array and a proximity signal of another row of pixels included in the pixel array by accumulating the average of the pixel signals output from the row of pixels included the pixel array and an average of pixel signals output from the another row of pixels included in the pixel array, respectively.

3. The image sensor of claim 1, further comprising a low-voltage processing circuit configured to generate a reduced voltage pixel signal based on a difference between a voltage of the pixel signal and a reset voltage of a floating diffusion (FD) node of the pixel array and a photodiode of the pixel array.

4. The image sensor of claim 3, wherein the voltage of the pixel signal is detected at the FD node when a shutter between the FD node and the photodiode is closed after the FD node and the photodiode are exposed for a period of time with the shutter open.

5. The image sensor of claim 1, further comprising an averaging circuit comprising capacitors and switches, and configured to generate the average of the pixel signals.

6. The image sensor of claim 5, wherein the average of the pixel signals is generated by closing capacitors.

7. The image sensor of claim 5, wherein the average of the pixel signals is further generated by an averaged voltage being read out to a PX line through an analog buffer, and sampled to the ADC.

8. A method of sensing an image, the method comprising:
   generating, by a pixel array, a pixel signal based on light reflected by a target, wherein the generating of the pixel signal comprises generating a reduced voltage pixel signal based on a difference between a voltage of the pixel signal and a reset voltage of a floating diffusion (FD) node of a pixel array and a photodiode of the pixel array;
   generating an image signal of the target based on the pixel signal; and
   generating a proximity signal of the target based on an average of pixel signals output from a row of pixels included in the pixel array.

9. The method of claim 8, wherein the generating of the proximity signal comprises generating a proximity signal of the row of pixels included in the pixel array and another row of pixels included in the pixel array by accumulating the average of the pixel signals output from the row of pixels included in the pixel array and an average of pixel signals output from the another row of pixels included in the pixel array, respectively.

10. The method of claim 8, further comprising determining a depth of the target based on an intensity of the proximity signal.

* * * * *